United States Patent
Chen

(10) Patent No.: US 7,640,017 B2
(45) Date of Patent: Dec. 29, 2009

(54) TELECOMMUNICATIONS

(75) Inventor: Xiaobao Chen, Swindon (GB)

(73) Assignee: Orange SA, Paris (FR)

( * ) Notice: Subject to any disclaimer, the term of this patent is extended or adjusted under 35 U.S.C. 154(b) by 412 days.

(21) Appl. No.: 10/548,920

(22) PCT Filed: Mar. 10, 2004

(86) PCT No.: PCT/GB2004/001023

§ 371 (c)(1),
(2), (4) Date: Sep. 28, 2006

(87) PCT Pub. No.: WO2004/082236

PCT Pub. Date: Sep. 23, 2004

(65) Prior Publication Data

US 2007/0025329 A1    Feb. 1, 2007

(30) Foreign Application Priority Data

Mar. 12, 2003    (GB) .................................. 0305673.6

(51) Int. Cl.
*H04W 36/36* (2006.01)
(52) U.S. Cl. ...................... 455/437; 455/452.1; 370/331
(58) Field of Classification Search ............... 455/435.2, 455/437, 439, 452.1; 370/328, 331, 335, 370/342, 443
See application file for complete search history.

(56) References Cited

U.S. PATENT DOCUMENTS 6,842,462 B1 * 1/2005 Ramjee et al. ............... 370/466
7,218,618 B2 * 5/2007 Greis et al. .................. 370/328
2003/0092444 A1 * 5/2003 Sengodan et al. ........... 455/436

FOREIGN PATENT DOCUMENTS

EP    1 202 591 A2    5/2002
GB    2373 409 A      9/2002

OTHER PUBLICATIONS

IP Mobility Support for IPv4, http://www.ietf.org/rfc/rfc3344.txt?number=3344, Request for Comments: 3344, pp. 1-93.

(Continued)

*Primary Examiner*—Blane J Jackson
(74) *Attorney, Agent, or Firm*—Knobbe Martens Olson & Bear LLP

(57) ABSTRACT

The present invention relates to apparatus for and methods of performing a binding procedure in respect of a mobile node in a foreign packet data network, the mobile node having roamed from a an home packet data network and having a home packet data protocol address, the method comprising the steps of: the mobile node sending its home packet data protocol address to a node of the network responsible for allocating packet data protocol addresses to mobile nodes for use in the foreign network (the allocating node); the allocating node allocating or participating in the allocation of a packet data protocol address to the mobile node; the allocating node receiving a packet data protocol address of a receiving node; and in dependence on the received home packet data protocol address, the receiving node packet data protocol address, and the allocated packet data protocol address, the allocating node sending or arranging for another network node to send a message to the receiving node, the message indicating a binding between the allocated packet data protocol and the home packet data protocol address of the mobile node.

16 Claims, 7 Drawing Sheets

OTHER PUBLICATIONS

IP Encapsulation within IP, Requests for Comments: 2003, http://www.ietf.org/rfc/rfc2003.txt ;pp. 1-14.

Generic Packet Tunneling in IPv6 Specification, Request for Comments: 2473, http://www.ietf.orq/rfc/rfc2473.txt, pp. 1-34.

Mobility Support in IPv6 <draft-ietf-mobileip-ipv6-18.txt>, http://www.ietf.org/proceedings/02jul/I-D/draft-ietf-mobileip-ipv6-18.txt, pp. 1-160.

3GPP T2 23.060 Technical Specification, GSM Global System for Mobile Communication, pp. 1-191.

Laaja, et al., GPRS VPNs compared to other VPNs, printed from web site, pp. 1-12.

\* cited by examiner

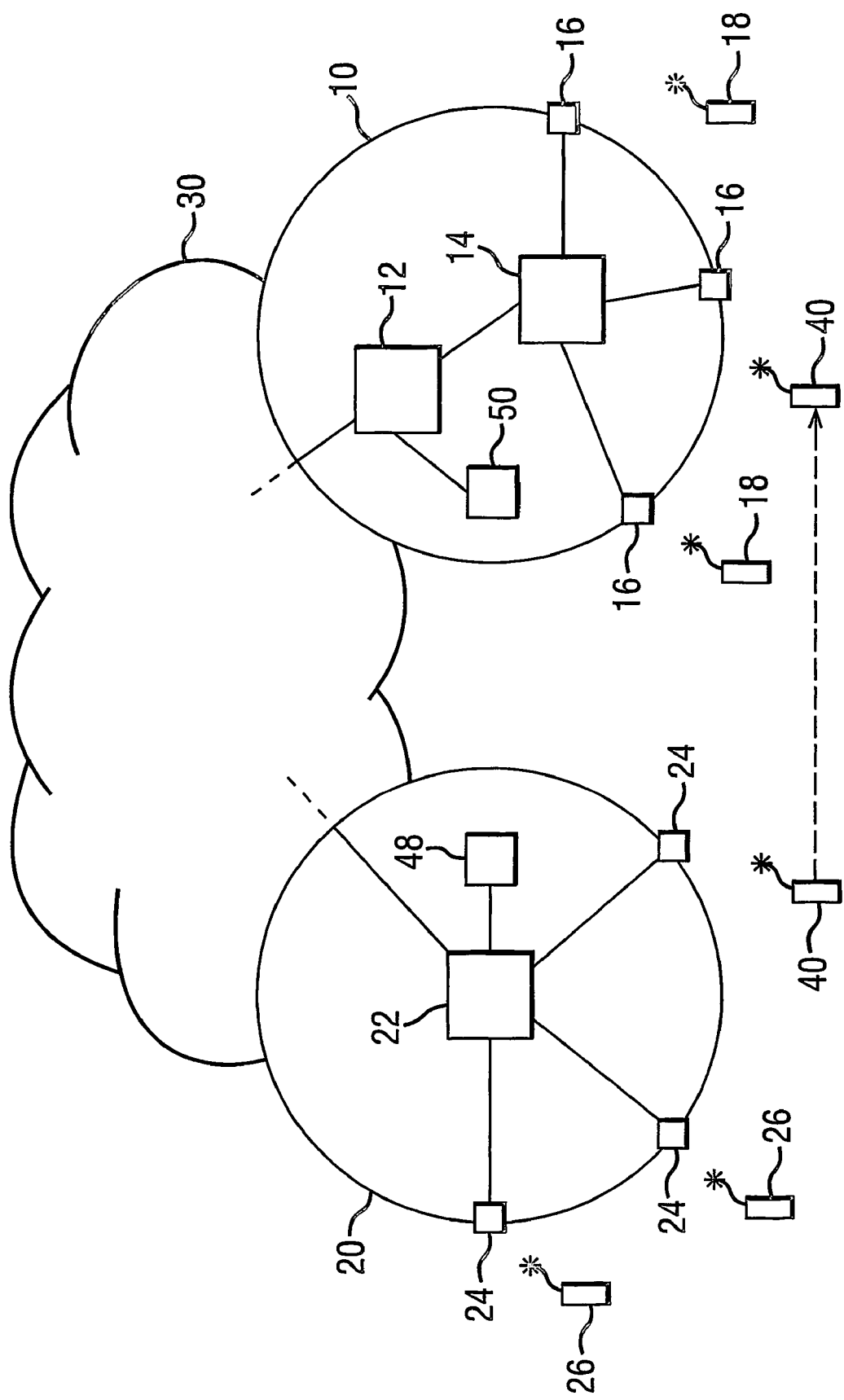

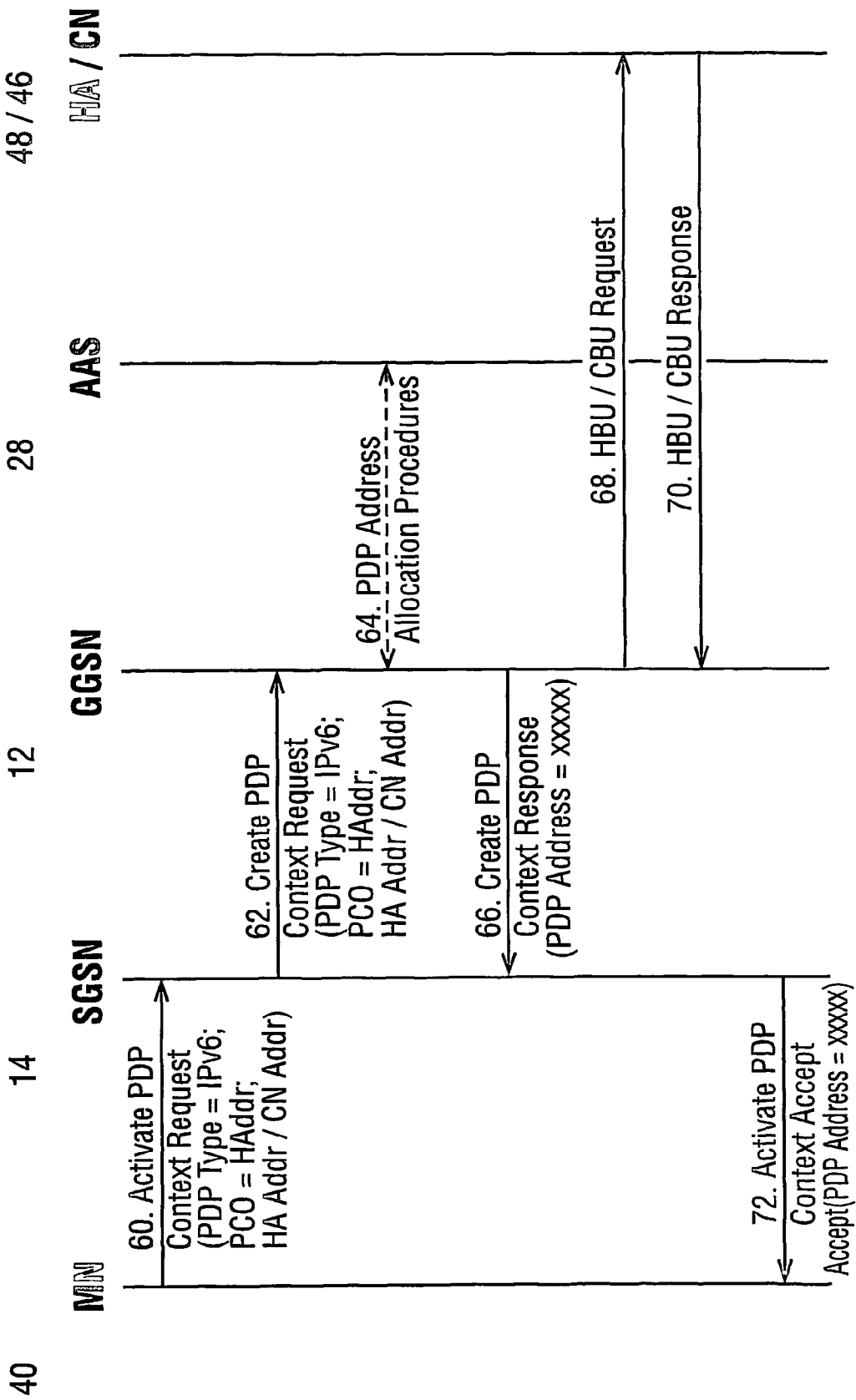

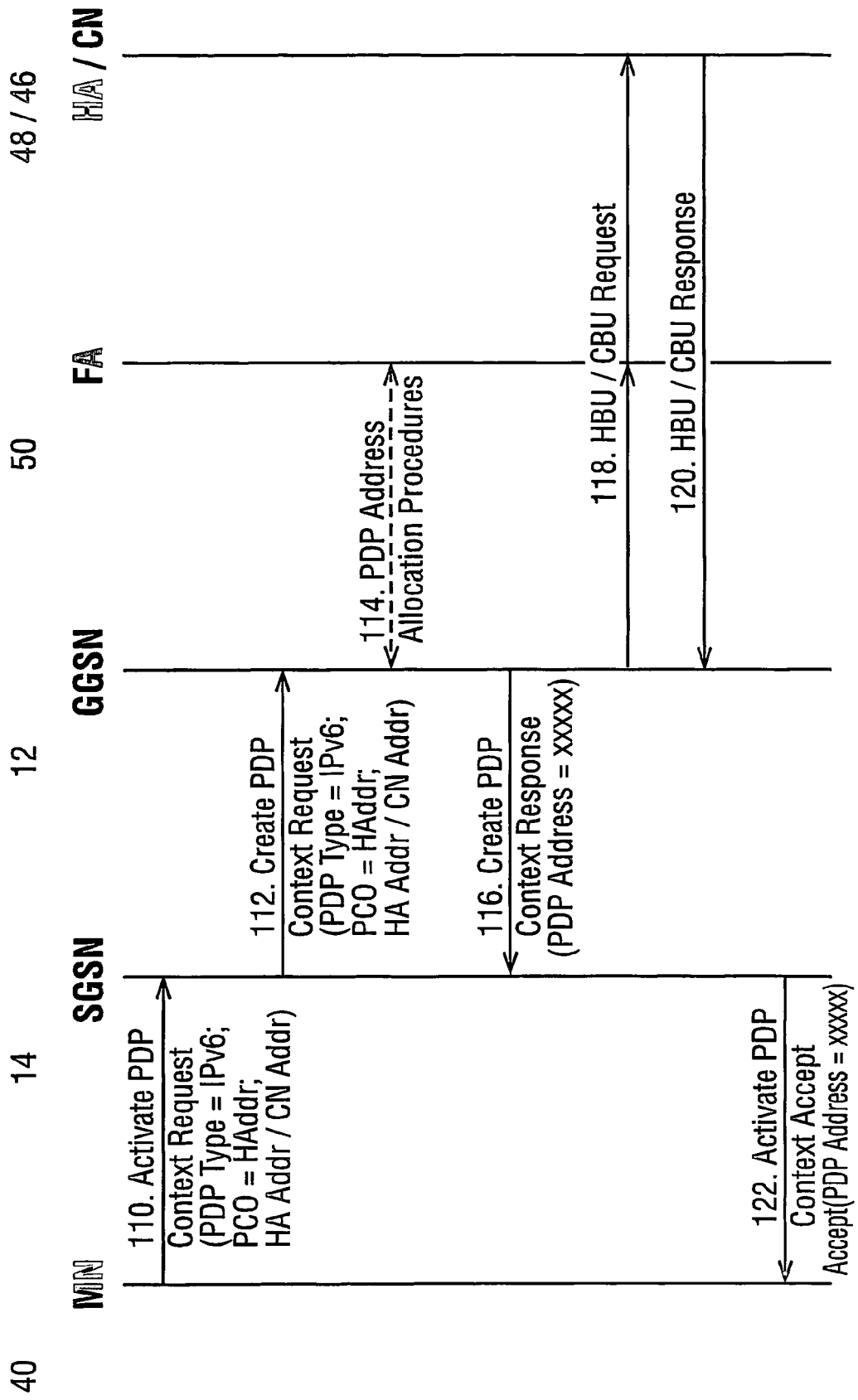

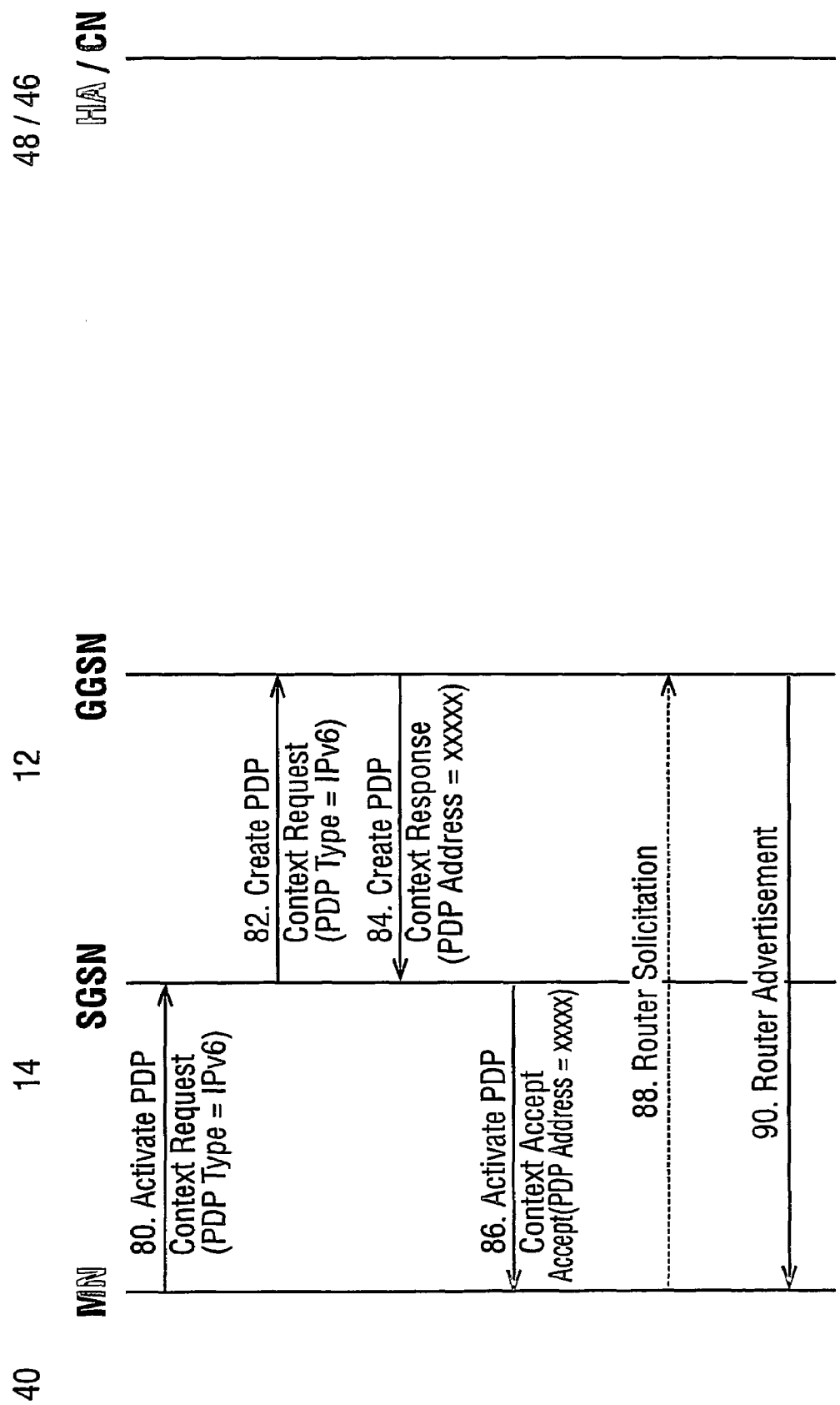

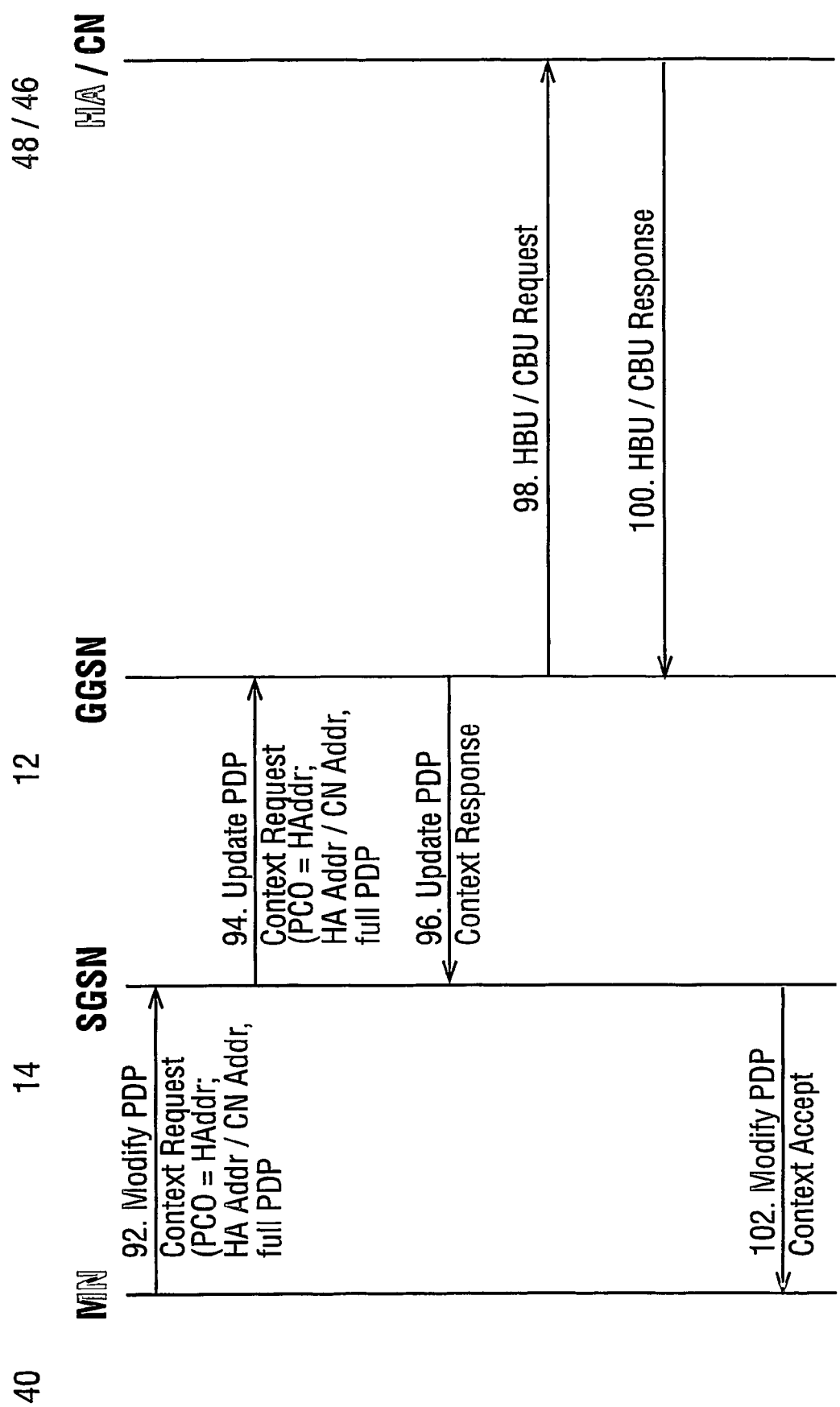

TELECOMMUNICATIONS

FIELD OF THE PRESENT INVENTION

The present invention relates to apparatus for and methods of performing a binding procedure in respect of a mobile node in a foreign packet data network, the mobile node having roamed from a home packet data network and having a home packet data protocol address. In particular, but not exclusively, the present invention relates to apparatus for and methods of sending, to a home agent of a Mobile Internet Protocol (MIP) enabled mobile node or to a correspondent node in communication with the mobile node, a MIP binding update message indicating a binding between a packet data protocol address allocated for use by the mobile node in the foreign network and the home packet data protocol address of the mobile node.

BACKGROUND

Whereas conventional 2G mobile networks, such as those conforming to the Global System for Mobile Communications (GSM) standards, have provided circuit-switched voice and data services to users' mobile stations (MSs), there is great momentum in the mobile telecommunications industry to deploy packet-switched mobile networks. Packet-switched mobile networks have significant advantages in terms of network and radio resource efficiency and also enable the provision of more advanced user services. With the convergence of fixed and mobile telecommunications, the Internet Protocol (IP), widespread in fixed networks, is the natural choice as the packet routing mechanism for mobile packet networks. Currently IP version 4 (IPv4) is in widespread use in the fixed network domain. However, it is expected gradually to migrate to IP version 6 (IPv6) which offers well-recognised benefits over IPv4, notably in terms of greatly increased address space, more efficient routing, greater scalability, improved security, Quality of Service (QoS) integration, support for multicasting and other features.

A particular example of a mobile packet-switched service currently being deployed is the General Packet Radio Service (GPRS) as implemented in both 2G GSM networks and in 3G Universal Mobile Telecommunications System (UMTS) networks (hereinafter referred to as GPRS networks). It is also expected that non-GPRS wireless access technologies, such as wireless Local Area Network (wLAN), will provide a flexible and cost-effective complement to GPRS for local broadband service access in some areas such as hotspots (conference centres, airports, exhibition centres, etc). wLAN subnetworks may be implemented within the same administrative network domain as GPRS subnetworks, and mobile network operators will want to support mobility of mobile stations between those subnetworks. Furthermore, mobile network operators will want to support roaming of mobile stations between different administrative network domains, which may or may not implement different access technologies.

While GPRS networks, having been designed from the start as mobile networks, have built-in mobility management (for MSs within the GPRS network) and roaming functionality (for MSs roaming between GPRS networks), work has also taken place in the Internet Engineering Task Force (IETF) to support mobility of IP user terminals in general. To this end, the IETF has developed the Mobile (MIP) protocols. MIP is designed to support mobility when mobile stations (or mobile nodes (MNs) in MIP terminology) move between IP networks with different subnet prefixes (macro-mobility). For example, MIP may be used to support mobility between a GPRS network and a non-GPRS network such as a wLAN network as well as mobility between two different GPRS networks or subnetworks. Mobile IP is not expected to be used for mobility management within a network or subnetwork (micro-mobility) which is typically managed by access technology specific layer 2 mechanisms such as WCDMA softer/soft handover.

There are two versions of MIP to correspond to the two versions of IP. MIP version 4 (MIPv4) is designed to provide IP address mobility for IP version 4 (IPv4) addresses, whereas the newer MIP version 6 (MIPv6) MIP is designed to provide IP address mobility for IP version 6 (IPv6) addresses. MIPv4 is described in the IETF Request For Comment (RFC) 3344 available at the IETF website http://www.ietf.org/rfc/rfc3344.txt?number=3344. Internet draft MIPv6 is described in the IETF Internet draft "Mobility Support in IPv6" available at the IETF website at http://search.ietf.org/internet-drafls/draft-ietf-mobileip-ipv6-20.txt and referenced as draft-ietf-mobileip-ipv6-20.txt.

MIPv4 mobility management is illustrated in FIG. 1. A MN 40 is allocated a home IP address (HAddr) in its Home Network (HN) 42. Routing procedures in the HN ensure that wherever the MN is within the HN, an IP packet sent from a Correspondent Node (CN) 46 will reach the MN. However, when the MN roams to a foreign network (FN) 44, IP packets addressed to its HAddr will need to be routed to its new location in the FN. In MIPv4, a router 48 in the HN known as the Home Agent (HA) is used to act as a packet forwarding service on behalf of the MN when it is away from home. In a first working mode of MIPv4 (known as FA-CoA mode), when arriving in the FN, the MN is allocated a Care of Address (CoA) by a router 50 in the FN known as the Foreign Agent (FA). Due to perceived limitations of IPv4 address space, it is envisaged that more than one MN may share the same CoA. After allocation of the CoA, the FA 50 sends a binding update to the HA to register the CoA. More specifically, the binding update informs the HA of the association (or binding) between the HAddr and CoA of the MN. Thereafter, when the CN sends a packet to the HAddr of the MN in its HN (case 1), the packet is intercepted by the HA and tunnelled to the FA in the FN via tunnel 52 on the basis of the CoA.

Tunnelling involves encapsulating a first data packet (with a header and a payload) as the payload of a second data packet having a new header indicating, as its source and destination addresses, the start and end points of the tunnel, and transferring the second data packet as normal to the tunnel endpoint where it is decapsulated to obtain the first packet. After decapsulation, the tunnel end point, the FA, routes the original packet to the MN using routing procedures in the FN. In MIP, tunnelling involves IP in IP encapsulation using the IETF Request For Comment (RFC) 2003. Thus in MIPv4, an IPv4 packet is tunnelled by encapsulating it within another IPv4 packet.

As an optional procedure in MIPv4, the HA may send a binding update to the CN to register the CoA of the MN. More specifically, the binding update informs the CN of the association (or binding) between the HAddr and CoA of the MN. Thereafter, the CN may address packets directly to the MN at its current CoA, rather than indirectly via its HAddr (case 2), and these packets are received by the FA in the FN and routed to the MN using routing procedures in the FN. This is known as route optimisation since it avoids potentially inefficient triangular routing via the HA which in general will not be on an efficient routing path between the CN and the FA.

In a second optional working mode of MIPv4 (known as CoCoA mode) there is no sharing of CoAs by MNs away from their home network and no FA is used. The MN is allocated a unique CoA, known as a co-located CoA (Co-CoA). In this working mode, the MN must itself send a binding update to its HA to register its newly allocated CoCoA. Thereafter, packets sent by a CN and addressed to the MN at its HAddr are tunnelled from the HA directly to the MN. As with FA-CoA mode, as an optional procedure in CoCoA mode, the MN may also send a binding update to a CN to register its CoCoA. Thereafter, packets may be sent by the CN directly to the MN at its CoCoA.

MIPv6 mobility management is illustrated in FIG. 2. Two notable differences of MIPv6 over MIPv4 are as follows. Firstly, due to the greatly increased address space in IPv6, CoAs allocated to a MN in a FN are never shared (ie they correspond to the optional CoCoA in MIPv4). Secondly, as a result, there is no need to deploy a FA in the FN. Referring to FIG. 2, with MIPv6, when a MN 40 moves from its HN 42 to a FN 44, it is allocated a unique CoA and sends a binding update to its HA 48 in its HN to register the CoA. Packets from a CN 46 addressed to the HAddr are intercepted by the HA 48 (case 1) and tunnelled to the CoA via tunnel 54. This tunnelling may be achieved using IPv6 Generic Packet Tunnelling Mechanism described in IETF RFC 2473. However, in MIPv6, route optimisation is not an option but a fundamental part of the protocol and, in general, the MN (not the HA as in MIPv4) should send a binding update to the CN so that it may address packets directly to the MN at its CoA (case 2). When a MN receives a packet tunnelled from a CN via the MN's HA, it may take this as an indication that the CN has no binding for the MN and initiate a CN binding update.

There are a number of problems which arise as a result of the binding update procedures specified in MIPv4 and MIPv6. The problems arise in connection with both binding updates to the HA (let us call these Home Binding Updates (HBUs)) and binding updates to a CN (let us call these Correspondent Binding Updates (CBUs)). One problem is resource utilization in the FN. In MIPv4 CoCoA mode and in MIPv6, the MN performs HBU and CBU procedures which utilise various resources of the FN, including valuable radio resources. With HBUs, this problem is exacerbated by the fact that HBUs will need to be sent periodically, even when the MN is not in use but roaming in a FN over extended periods of time. Resource utilization may also be a problem in MIPv4 FA-CoA mode where the FA performs the HBU.

Another problem with HBU and CBU procedure is security. The issuing of false binding updates to the HA or CN of a MN can lead to security attacks including denial-of-service, confidentiality, man-in-the-middle, hijacking and impersonation attacks (see MIPv6 draft specification section 14, for example). Thus, complex security procedures are mandated in the MIP specifications (see MIPv6 draft specification section 5, for example). These security procedures are slow and costly in terms of processing requirements at the HA, CN and at the MN. This can also adversely effect battery lifetime at the MN and CN.

Another problem is that any delay in HBU procedures can lead to misdirecting of packets to an old CoA, caching of packets at the HA or, worse still, loss of those packets. Similarly, any delay in CBU procedures can lead to misdirecting of packets to an old CoA, triangular routing via the HA or, worse still loss of those packets. These effects lead to decreased performance at the HA, unnecessary loading of routers through which misdirected or non route optimised packets are sent, and possible disruption to communication sessions between the MN and CN.

SUMMARY OF THE PRESENT INVENTION

According to a first aspect of the present invention, there is provided a method of performing a binding procedure in respect of a mobile node in a foreign packet data network, the mobile node having roamed from a home packet data network and having a home packet data protocol address, the method comprising the steps of:

the mobile node sending its home packet data protocol address to a node of the network responsible for allocating packet data protocol addresses to mobile nodes for use in the foreign network (the allocating node);

the allocating node allocating or participating in the allocation of a packet data protocol address to the mobile node;

the allocating node receiving a packet data protocol address of a receiving node; and in dependence on the received home packet data protocol address, the receiving node packet data protocol address, and the allocated packet data protocol address, the allocating node sending or arranging for another network node to send a message to the receiving node, the message indicating a binding between the allocated packet data protocol and the home packet data protocol address of the mobile node.

According to a second aspect of the present invention, there is provided an allocating node of a foreign packet data network arranged to perform a binding procedure in respect of a mobile node, the mobile node having roamed from a home packet data network and having a home packet data protocol address, the allocating node comprising:

means for receiving from the mobile node a message comprising the home packet data protocol;

means for allocating or participating in the allocation of a packet data protocol address to the mobile node;

means for receiving a packet data protocol address of a receiving node;

means for constructing a binding update message on the basis of the received home packet data protocol address, the receiving node packet data protocol address, and the allocated packet data protocol address, the message indicating a binding between the allocated packet data protocol and the home packet data protocol address of the mobile node; and means for sending or arranging for another network node to send the constructed message to the receiving node.

Further aspects of the present invention are set out in the accompanying claims.

By having the allocating node performing the binding update procedure on behalf of the mobile node, the present invention advantageously enables faster binding update procedures. Furthermore, resources in the foreign network, especially radio resources, are saved and binding update security procedures simplified. These advantages of the present invention will be explained in greater detail in the detailed description.

There now follows, by way of example only, a detailed description of preferred embodiments of the present invention in which:

BRIEF DESCRIPTION OF DIAGRAMS

FIG. 3 is a network architectural diagram showing a GPRS network and a wLAN network connected via an external packet-switched network cloud;

FIGS. 4, 5 and 6 show address allocation procedures modified to include binding procedures according to first, second and third embodiments of the present invention, respectively.

DETAILED DESCRIPTION OF EMBODIMENTS OF THE PRESENT INVENTION

Figure 1:
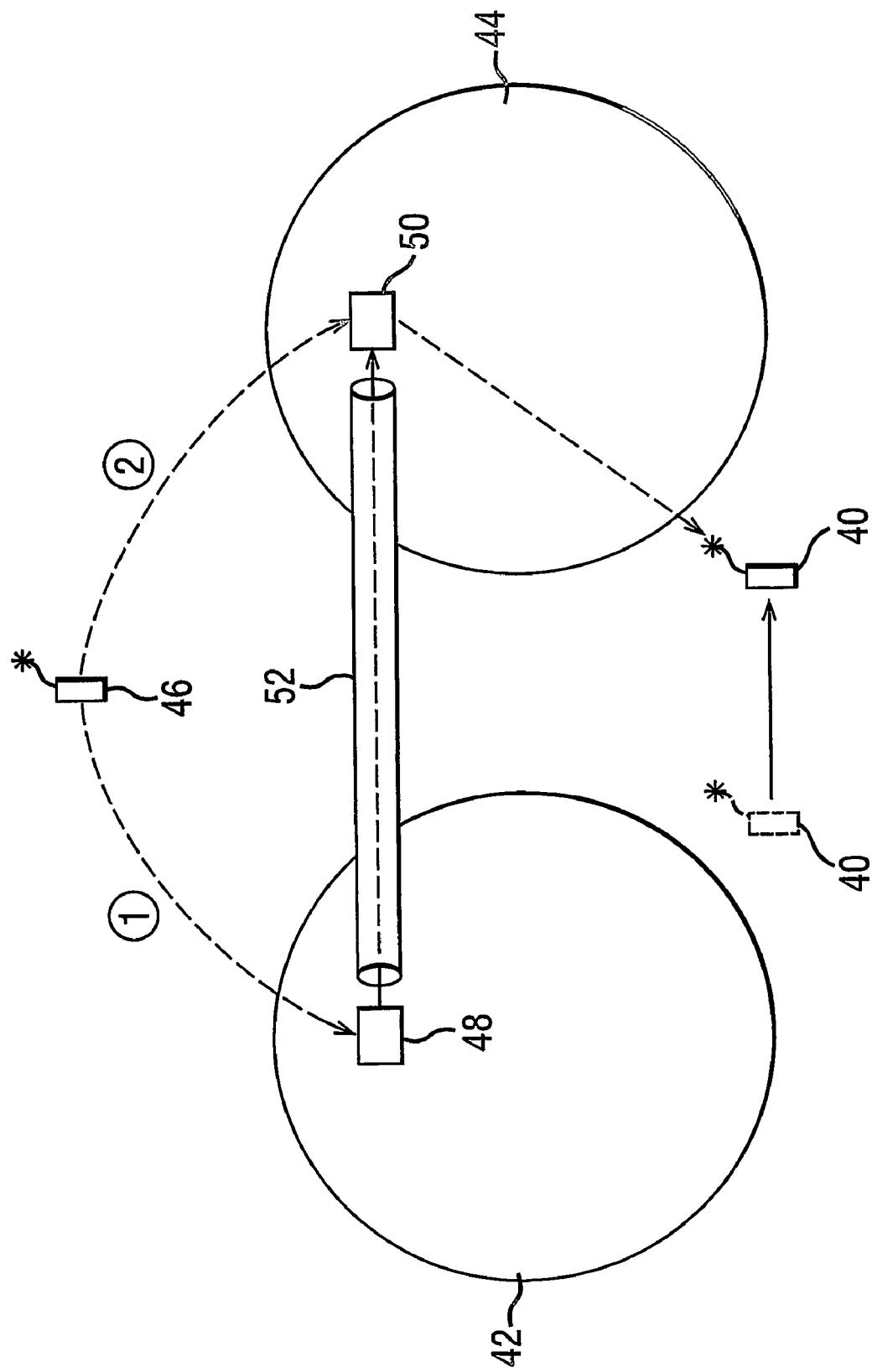
FIG. 1 is a conceptual diagram showing mobility management as provided in MIPv4.
Figure 2:
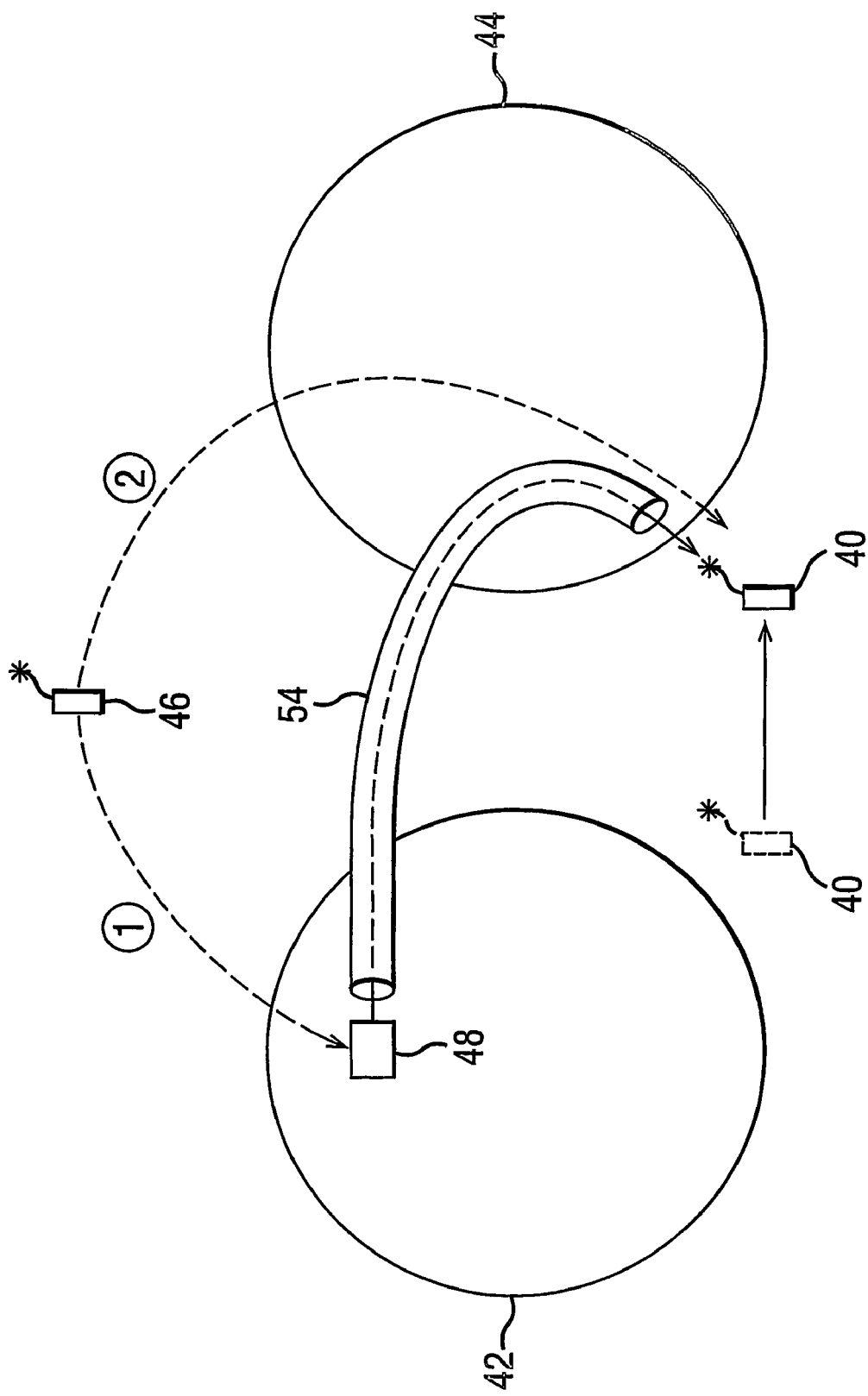
FIG. 2 is a conceptual diagram showing mobility management as provided in MIPv6.

The present invention will now be described in detail with reference to a MN which is away from home in a GPRS network, but it will be understood that the invention applies to packet data protocol address reporting procedures for a MN which is away from home in any type of packet data network whether fixed or mobile. Furthermore, we will assume that the MN has been allocated a HAddr and has a HA in a wLAN which is its HN, but it will be understood that the invention applies where the HN is any type of packet data network whether fixed or mobile.

FIG. 3 shows an exemplary network architecture in which a GPRS network 10 and a wLAN network 20 are connected together (and with one or more external packet networks) via packet network cloud 30. GPRS network 10 and a wLAN network 20 may be subnetworks within the same administrative domain or in different administrative domains.

GPRS network 10 is connected to external packet network cloud 30 via one or more Gateway GPRS Support Nodes (GGSNs) (although here only one GGSN 12 is illustrated) which communicate with one or more Serving GPRS Support Nodes (SGSNs) (although here only one SGSN 14 is illustrated) via an internal IP-based packet-switched backbone network. SGSN 14 keeps track of the location of individual Mobile Stations (MSs) attached to the GPRS service and performs security functions and access control. SGSN 14 is itself connected to one or more Radio Access Networks (RANs) 16 (either the Base Station Subsystem (BSS) in the 2G GSM network or UMTS Terrestrial Radio Access Network (TAN) in the 3G UMTS network). The RANs control communication over the air with MSs 18.

Other major components of GPRS network 10, such as the Home Location Register (HLR) which stores GSM and UMTS subscription data and the Mobile Switching Centre/Visitor Location Register (MSC/VLR) which handles circuit-switched services and also keeps track of the location of individual Mobile Stations (MSs), are omitted for clarity. The reader is referred to the GPRS Service Description (release 1999) Technical Specification, referred to as 3G TS 23.060 v3.12.0 (2002-06) and available from the 3GPP website at http://www.3gpp.org/ftp/specs/2002-06/R 1999/23_series/, which provides a detailed service description for 2G (GPRS/GSM) and 3G (GPRS/UMTS) mobile packet networks. The functionality of GPRS networks is also generally well-known, although further aspects will be described in detail below.

WLAN network 20 is connected to external packet network cloud 30 via an Access Controller (AC) 22 which controls one or more Access Points 24 which communicate over the air with MSs 26. The functionality of wLAN networks is generally well-known and will not be described in detail further herein.

Let us suppose that a MIPv4 or MIPv6-enabled MN 40 has booted up in wLAN 20. It will normally undergo authentication and be allocated a HAddr (IPv4 or IPv6) for use in wLAN 20 which becomes its HN. Authentication and HAddr allocation may be performed through conventional procedures. MN 40 will also select a router 48 in wLAN 20 to serve as its HA through standard MIPv4 or MIPv6 HA discovery mechanisms, or it may be allocated HA 48 through static configuration. Thus, the IP address of the HA (the HA Addr) will be known to or at least discoverable by MN 40. MN 40 may enter into communication sessions with various CNs, such as CN 46, in a conventional manner. CN 46 may be in wLAN 20 itself, in GPRS network 10, or in any interconnected network.

Let us now suppose that MN 40 roams to GPRS network 10. MN 40 may or may not be in a communication session with CN 46 at this point. In order to access GPRS packet-switched services, MN 40 first performs a GPRS attach procedure with the SGSN (either a 2G GSM GPRS attach or a 3G UMTS GPRS attach). Mandatory authentication procedures are performed using either GSM or UMTS authentication based on subscriber information stored in the MN's Subscriber Identity Module (SIM) or User Service Identity Module (USIM) and the HLR (see 3G TS 23.060 section 6.8.1). If successful, the GPRS attach procedure makes MN 40 available for paging via the SGSN and notification of incoming packet data.

However, to actually send and receive packet data, MN 40 must be allocated a Packet Data Protocol (PDP) address for use in GPRS network 10—ie an IPv4 or IPv6 address. Furthermore, MN 40 must create and activate at least one PDP context for use with that PDP address. In GPRS, each PDP address for a MS may have one or more PDP contexts associated with it. The process of PDP context activation makes a MS known not only to the SGSN, but also to the corresponding GGSN and inter-working with external data networks can commence.

Conventionally, allocation of a PDP address for use by MN 40 is the responsibility of the GGSN and takes place within the Activate PDP Context procedure (see 3G TS 23.060 Clause 9.2). According to the present invention, the conventional PDP context activation and address allocation procedure may be modified or supplemented to include HBU procedures to report the allocated PDP address (ie a CoA or CoCoA) to HA 48 in wLAN 20. Furthermore, if MN 40 is in a communication session with CN 46, the conventional PDP context activation and address allocation procedure may be modified or supplemented to include CBU procedures to report the allocated PDP address to CN 46. Since technical implementation of the present invention to perform HBU and CBU procedures are largely similar, they will be described jointly. However, it will be understood that the embodiments of the present invention apply to performing 1) HBU procedures without CBU procedures, 2) CBU procedures without HBU procedures, and 3) combined HBU and CBU procedures within modified or supplemented PDP context activation and address allocation procedures.

Furthermore, the procedures, described in the following embodiments of the present invention, will vary depending on whether MIPv6, MIPv4 (CoCoA mode) or MIPv4 (FA CoA mode) is used, as well as whether static address allocation, or either stateful or stateless address autoconfiguration (IPv6) is used and whether dynamic or static address allocation (IPv4) is used. Furthermore, some embodiments apply equally whether or not GPRS network 10 and WLAN 20 are subnetworks of the same administrative domain or different administrative domains, whereas some will be more likely to apply only where GPRS network 10 and wLAN 20 are subnetworks of the same administrative domain. These factors will be indicated accordingly below.

First Embodiment

FIG. 4 shows a PDP context activation and address allocation procedure modified to include HBU and/or CBU procedures according to a first embodiment of the present invention. This embodiment applies whether GPRS network 10 and wLAN 20 are subnetworks of the same administrative domain or of different administrative domains. However, this embodiment particularly applies where:

a) MN 40 is MIPv6-enabled and IPv6 stateful address autoconfiguration is used to allocate the PDP address (ie a MIPv6 CoA); or b) MN 40 is MIPv4-enabled, GPRS network 10 operates in MIPv4 CoCoA mode and IPv4 dynamic address allocation is used to allocate a PDP address (ie a MIPv4 CoCoA).

At step 60, MN 40 sends an Activate PDP Context Request message to its SGSN 14. The Activate PDP Context Request message leaves the PDP Address field empty to request dynamic allocation of a PDP address but may set the PDP Type field to IPv4 or IPv6 to specify the type of address required. PDP Configuration Options are used to provide the HAddr of the MN and HA Addr (ie the IP address of HA 48) and/or the CN Addr (ie the IP address of CN 46). At step 62, SGSN 14 sends a Create PDP Context Request message to GGSN 12 including the parameters of the Activate PDP Context Request message. At step 64, GGSN 12 dynamically obtains a PDP address to be allocated to MN 40 (ie an IPv4 or IPv6 address) from an Address Allocating Server (AAS) 28. AAS 28 may be implemented as a Dynamic Host Configuration Protocol (DHCP) server and GGSN 12 functions as a DHCP relay client. Alternatively, AAS 28 may be implemented as a Remote Authentication Dial-In User Service (RADIUS) server, or a Diameter server. Note that AAS 28 may be internal to GPRS network 10 or external to it. Furthermore, if internal, the AAS 28 function may be integrated into the same physical node as GGSN 12.

After the PDP address has been allocated, GGSN 12 has all the necessary information to perform HBU and/or CBU procedures on behalf of MN 40. At step 66, GGSN 12 sends a Create PDP Context Response message to SGSN 14 including the allocated PDP address. Then, at step 68, GGSN 12 sends a HBU Request message to HA 48 and/or a CBU Request message to CN 46 on behalf of MN 40. These messages are referred to in the MIP specifications as Binding Update MIPv6) or Registration Request (MIPv4) messages and will be described in more detail below. At step 70, HA 48/CN 46 send a HBU Response/CBU Response message (referred to in the MIP specifications as Binding Acknowledgement MIPv6) or Registration Reply MIPv4) messages) to GGSN 12 indicating successful HBU/CBU. By performing HBU and/or CBU procedures on behalf of MN 40, GGSN 12 in effect acts as a proxy binding agent for MN 40. At step 72, SGSN 14 sends an Activate PDP Context Accept message to MN 40 including the allocated PDP address which completes the address allocation and PDP context activation procedure.

The format of the MIPv6 Binding Update sent by GGSN 12 to HA 48 is as specified in MIPv6 (see section 6.1.7 and 11.7.1 of MIPv6) save for the following differences. The IPv6 Source Address will be the address of GGSN 12 rather than the address of MN 40. Furthermore, the HAddr of MN 40 must be included in a Home Address destinations option IPv6 extension header (as specified in MIPv6 section 6.1.7), and the newly allocated CoA will be included in an Alternate Care of Address Mobility Option (see section 6.2.4 of MIPv6).

Similarly, the format of the MIPv6 Binding Update sent by GGSN 12 to CN 46 is as specified in MIPv6 (see section 6.1.7 and 11.7.2 of MIPv6) save for the following differences. The IPv6 Source Address will be the address of GGSN 12 rather than the address of MN 40. Furthermore, the HAddr of MN 40 must be included in a Home Address destinations option IPv6 extension header (as specified in MIPv6 section 6.3), and the newly allocated CoA will be included in an Alternate Care of Address Mobility Option (see section 6.2.4 of MIPv6).

The format of the MIPv4 Registration Request message sent by GGSN 12 to HA 48 is as specified in MIPv4 (see section 3.3 of MIPv4) save that the IPv4 Source Address will be the address of GGSN 12 rather than the address of MN 40. Apart from that, the Registration Request is as standard—in particular the Mobile IP fields (contained in the payload of a User Datagram Protocol (UDP) packet) contain the HAddr, HA Addr and newly allocated CoCoA of MN 40 as described in the MIPv4 specification (see section 3.3).

In a variant of the first embodiment, AAS 28 may be instructed by GGSN 12 to perform HBU and/or CBU procedures on behalf of MN 40 instead of GGSN 12 itself. The information required (HAddr, and HA Addr/CN Addr) may be sent to AAS 28 in a message sent during PDP allocation procedures at step 64. Note AAS 28 will have the newly allocated PDP address since it allocated it. Steps 68 and 70 will therefore involve interactions between AAS 28 and HA 48/CN 46.

Second Embodiment

FIG. 5 shows a PDP context activation and address allocation procedure modified to include HBU and/or CBU procedures according to a second embodiment of the present invention. This embodiment applies whether GPRS network 10 and wLAN 20 are subnetworks of the same administrative domain or of different administrative domains. However, this embodiment particularly applies where MN 40 is MIPv4-enabled, GPRS network 10 operates in MIPv4 FA CoA mode.

Recall that with MIPv4 FA-CoA mode, one or more MNs share a CoA provided by a FA. According to 3G TS 23.060, Clause 5.7, FA functionality may be integrated into GGSN 12. However, for generality, it will be assumed that the GGSN 12 and the router 50 acting as FA for MN 40 are separate nodes of GPRS network 10, although the present invention applies equally to the special case where FA 50 and GGSN 12 are integrated.

At step 110, MN 40 sends an Activate PDP Context Request message to its SGSN 14. The Activate PDP Context Request message leaves the PDP Address field empty to request dynamic allocation of a PDP address but may set the PDP Type field to IPv4 to specify the type of address required. PDP Configuration Options are used to provide the HAddr of the MN and HA Addr of HA 48/CN Addr of CN 46. At step 112, SGSN 14 sends a Create PDP Context Request message to GGSN 12 including the parameters of the Activate PDP Context Request message. At step 114, GGSN 12 obtains a PDP address to be allocated to MN 40 (ie a CoA) from FA 50.

After the PDP address (CoA) has been allocated, GGSN 12 has all the necessary information to perform HBU and/or CBU procedures on behalf of MN 40. At step 116, GGSN 12 sends a Create PDP Context Response message to SGSN 14 including the allocated PDP address. Then, at step 118, GGSN 12 sends a HBU Request message to HA 48 and/or a CBU Request message to CN 46 on behalf of MN 40 as described above in respect of the first embodiment. Note that in MIPv4 FA-CoA mode, the HBU message (referred to as a Home Registration message) and CBU message are relayed via the FA as indicated in FIG. 5. At step 120, HA 48/CN 46 send a HBU Response/CBU Response message to GGSN 12 indicating successful HBU/CBU. At step 70, SGSN 14 sends an Activate PDP Context Accept message to MN 40 including the allocated PDP address which completes the address allocation and PDP context activation procedure.

The format of the MIPv4 Binding Update messages sent by GGSN 12 to HA 48 and/or CN 46 are as specified above in relation the first embodiment.

In a variant of the second embodiment, FA 50 may be instructed by GGSN 12 to perform HBU and/or CBU procedures on behalf of MN 40 instead of GGSN 12 itself. The information required (HAddr, and HA Addr/CN Addr) may be sent to FA 50 in a message sent during PDP allocation procedures at step 114. Note FA 50 will have the newly allocated PDP address since it allocated it. Steps 118 and 120 will therefore involve interactions between FA 50 and HA 48/CN 46.

In the first and second embodiments described above, by having GGSN 12, AAS 28 or FA 50 perform HBU and/or CBU procedures on behalf of MN 40 during the GPRS PDP context activation and address allocation procedures, instead of having MN 40 perform separate and subsequent conventional HBU and/or CBU procedures, faster HBU and CBU can be achieved and resources in GPRS network 10, especially radio resources, will be conserved.

Third Embodiment

FIG. 6 shows a PDP context activation and address allocation procedure modified to include HBU and/or CBU procedures according to a third embodiment of the present invention. This embodiment applies whether GPRS network 10 and wLAN 20 are subnetworks of the same administrative domain or of different administrative domains. However, this embodiment particularly applies where MN 40 is MIPv6-enabled and IPv6 stateless address autoconfiguration is used to allocate the PDP address (ie a MIPv6 CoA).

With IPv6 stateless address autoconfiguration within GPRS, the full IPv6 address allocated to a MS may be partly provided by the GGSN and partly by the MS itself, the MS having listened to router advertisements and obtained link local interface identifiers. Thus, the GGSN does not know the full PDP address allocated to the MS. In this embodiment, the PDP Context Activation procedure is supplemented with a further PDP modification procedure to provide the information the GGSN needs to perform HBU and/or CBU procedures including the HAddr, HA Addr/CN Addr and the newly allocated full PDP address (ie the MIPv6 CoA).

Steps 80 to 90 follow the standard IPv6 stateless address autoconfiguration within GPRS as described in 3G TS 23.060 at Clause 9.2.1.1. At step 80, NM 40 sends an Activate PDP Context Request message to its SGSN 14. The Activate PDP Context Request message leaves the PDP Address field empty to request dynamic allocation of a PDP address but may set the PDP Type field to IPv6 to specify the type of address required. At step 82, SGSN 14 sends a Create PDP Context Request message to GGSN 12 including the parameters of the Activate PDP Context Request message. At step 84, GGSN 12 sends a Create PDP Context Response message to SGSN 14 including a PDP address composed of a prefix allocated to the PDP context and an interface identifier. At step 86, SGSN 14 sends an Activate PDP Context Accept message to MN 40 including the allocated PDP address. MN 40 may, optionally, send a Router Solicitation message to GGSN 12 at step 88 to activate the sending of a Router Advertisement message which is sent by GGSN 12 to MN 40 at step 90. The Router Advertisement message contains the same prefix allocated to the PDP context as provided in steps 82 and 84. MN 40 then constructs its full IPv6 address on the basis of the prefix and either a) the interface identifier also provided in step 82 and 84, or b) a locally generated interface identifier.

Then, according to the present invention, at step 92, MN 40 sends a Modify PDP Context Request message to its SGSN 14. MN 40 may be arranged to perform this step automatically every time it constructs a new IPv6 address through IPv6 stateless address autoconfiguration. The Modify PDP Context Request message contains a PDP Configuration Options field with the HAddr and HA Addr/CN Addr together with the newly constructed PDP Address (ie a MIPv6 CoA). Note that this requires a change in the specification of the current GPRS standard to include an optional PDP Configuration Options field in the MS-initiated Modify PDP Context procedure, since this option is currently not defined, or at least a user modification. The format and procedure for use of the optional PDP Configuration Options field in the MS-initiated Modify PDP Context procedure would be as specified for the optional PDP Configuration Options field in the MS-initiated Activate PDP Context procedure, as described in the 3G TS 23.060 Clause 9.2 and in the 3G TS 23.060 in general. At step 94, SGSN 14 sends an Update PDP Context Request message to GGSN 12 including the PDP Configuration Options parameters of the Modify PDP Context Request message. GGSN 12 now has all the necessary information to perform HBU and/or CBU procedures on behalf of MN 40. At step 96, GGSN 12 sends an Update PDP Context Response message to SGSN 14. At step 98, GGSN 12 sends an HBU Request message to HA 48 and/or a CBU Request message to CN 46 on behalf of MN 40. At step 100, HA 48/CN 46 send an HBU Response message/CBU Response message to GGSN 12 indicating successful HBU/CBU. At step 102, SGSN 14 sends a Modify PDP Context Accept message to MN 40.

The format of the MIPv6 Binding Update message sent by GGSN 12 to HA 48 and/or CN 46 is as specified above in relation the first embodiment.

In a variant of the third embodiment, steps 80 and 82 of the standard PDP context activation procedure may be modified so that the HAddr and HA Add/CN Addr are provided to GGSN 12 in a PDP Configuration Option field of the Activate PDP Context Request and Create PDP Context messages, rather than in the Modify PDP Context Request and Update PDP Context Request messages of steps 92 and 94 which provide the full PDP address as described above. Other variants of the third embodiment are possible in which the various items of information required by GGSN 12 to perform HBU and/or CBU procedures (HAddr, HA Addr/CN Addr and (full) PDP address) are provided to GGSN 12 in various combinations of a PDP context activation procedure and one or more supplemental PDP context modification procedures.

By having GGSN 12 perform HBU and/or CBU procedures on behalf of MN 40 during a GPRS PDP modification procedure (which uses the already established control plane connections between MN 40, SGSN 14, and GGSN 12) rather than a conventional HBU/CBU procedures (which require the establishment and use of a user plane IP connection between MN 40, SGSN 14, and GGSN 12), resources, especially radio resources, are conserved in GPRS network 10.

It will be appreciated that use of GPRS PDP modification procedure to provide GGSN 12 to perform HBU and/or CBU procedures on behalf of MN 40, as described in the third embodiment, may also be applied where:

a) MN 40 is MIPv6-enabled and IPv6 stateful address autoconfiguration is used to allocate the PDP address (ie a MIPv6 CoA); or b) MN 40 is MIPv4-enabled, GPRS network 10 operates in MIPv4 CoCoA mode and IPv4 dynamic address allocation is used to allocate a PDP address (ie a MIPv4 CoCoA); or c) MN 40 is MIPv4-enabled, GPRS network 10 operates in MIPv4 FA CoA mode.

However, it is likely that the procedures described above in relation to the first and second embodiments of the present invention will be preferred to the procedure of the third embodiment in these three cases since the former procedures offer extra advantages as described above.

According to variants of the first, second and third embodiments described above, MN 40 does not provide the HA Addr to GGSN 12 in either PDP context activation or PDP modification procedures to enable GGSN 12 to perform HBU procedures on its behalf. Instead, GGSN 12 uses the HA discovery mechanisms of MIPv4 or MIPv6 (as appropriate) to obtain the address of a suitable HA. These variants are more likely to apply where GPRS network 10 and wLAN 20 are subnetworks of the same administrative domain or of different administrative domains. This is because the overheads of using MIPv4 or MIPv6 HA discovery mechanisms within a single administrative domain are small compared to the overheads of using those mechanisms across multiple administrative domains, possibly including all those different networks that a MN may roam from.

With MIPv6, GGSN 12 may use the HA discovery mechanism by periodically sending an Internet Control Message Protocol (ICMP) HA Discovery Request Message to the MIPv6 HA's anycast address in wLAN 20 and receiving an ICMP HA Discovery Reply Message in response (as described in MIPv6 sections 6.5, 6.6 and 11.4.1). The HA's anycast address in wLAN 20 may be statically configured in GGSN 12. The ICMP HA Discovery Reply Message provides GGSN 12 with the addresses of one or more suitable HAs to use when performing proxy HBU procedures as described above.

Where there are one or more MIPv6 HAs for which GGSN 12 may need to perform proxy HBU procedures, GGSN 12 will periodically send ICMP HA Discovery Request Messages to the HA's anycast addresses and receive ICMP HA Discovery Reply Messages in response. Thus, GGSN 12 will maintain a list of the routers in wLAN 20 and other subnetworks or networks which are serving as HAs and, for any given MN, GGSN 12 will be able to select a suitable HA Addr to send the HBU Request Message on the basis of the MN's HAddr.

With MIPv4 (and as an alternative to the above MIPv6 procedure), GGSN 12 may use the MIPv4 or MIPv6 HA discovery mechanisms by listening to ICMP Router Advertisements from HAs in wLAN 20 (as described in MIPv4 sections 2.1 and 2.1.1) or the IPv6 Neighbour Discovery Router Advertisements from HAs in wLAN 20 (as described in MIPv6 sections 7.1, 7.4 and 10.5.1). These Router Advertisements provide GGSN 12 with the addresses of one or more suitable HAs to use when performing proxy HBU procedures as described above.

As above, where there are one or more HAs for which GGSN 12 may need to perform proxy HBU procedures, GGSN 12 will listen to ICMP Router Advertisements (MIPv4) and IPv6 Neighbour Discovery Router Advertisements (MIPv6) from each of those HAs. Thus, GGSN 12 will maintain a list of the routers in wLAN 20 and other subnetworks or networks which are serving as HAs and, for any given MN, GGSN 12 will be able to select a suitable HA Addr to send the HBU Request Message on the basis of the MN's HAddr.

According to further variants of the first, second and third embodiments described above, MN 40 does not provide the HA Addr to GGSN 12 in either PDP context activation or PDP modification procedures to enable GGSN 12 to perform HBU procedures on its behalf. Instead, a list of one or more HA Addresses is statically configured in GGSN 12 for sending the HBU Request Message to on behalf of MN 40. These variants apply to the same cases as the first, second and third embodiments respectively.

Where there one or more HAs for which GGSN 12 may need to perform proxy HBU procedures, GGSN 12 will be statically configured with a list of those one or more HAs. Thus, for any given MN, GGSN 12 will be able to select a suitable HA Addr to send the HBU Request Message on the basis of the MN's HAddr.

In yet further variants of the first, second and third embodiments described above, MN 40 may have been allocated with a static CoA or CoCoA for use in GPRS network 10. Thus, instead of being allocated a PDP address through IPv6 stateful or stateless address autoconfiguration, or through IPv4 dynamic address allocation (either via AAS 28 or FA 50), MN 40 already has an allocated PDP address which it provides to GGSN 12 in either the PDP activation procedure or a subsequent PDP modification procedure. This is then reported to HA 48 or CN 46 in respective HBU/CBU procedures as described above.

Conventionally, upon receipt of HBU Request messages, a HA will perform security functions to check its security association with the MN. This is to prevent fraudulent binding updates which are a major security threat in MIP. However, in the present invention, since the HBU Request messages are sent by GGSN 12, FA 50 or AAS 28, and not MN 40, HA 48 need only check its security association with GGSN 12, FA 50 or AAS 28 as appropriate, relying on GPRS network 10 to have authenticated MN 40 during the GPRS attach procedure. A security association between GGSN 12 and HA 48 can be set up on a permanent or semi-permanent basis. For example, GGSN 12 and HA 48 can be configured with a security association a) by the network operator, if GPRS network 10 and WLAN 20 are within the same administrative domain, or b) under a roaming agreement between network operators, if GPRS network 10 and wLAN 20 are in different administrative domains.

It will be appreciated that the precise order in which some of the messages, sent between various of the entities described in the embodiments and variations above, take place may vary without adversely affecting the procedures of the present invention.

As mentioned above, the present invention applies to packet data protocol address reporting procedures for a MN which is away from a home network which may be any type of packet data network whether fixed or mobile. Furthermore, the present invention applies where the MN is provided service in a foreign network which may be any type of packet data network whether fixed or mobile. While the embodiments described above show how the GPRS PDP address allocation procedures may be modified or supplemented, it will be appreciated that, with other types of packet data network, corresponding PDP address allocation procedures may be similarly modified according to the present invention.

Furthermore, although the embodiments have been described above in relation to MIP, it will be apparent that the present invention applies in general to providing a binding update to a receiving node, the binding update indicating a binding between a packet data protocol address allocated to a mobile node for use in a foreign packet data network and a home packet data protocol address of the mobile node.

The invention claimed is:

1. A method of performing a binding procedure for a mobile node in a foreign network, the mobile node having roamed from a home network and having a home packet data protocol address, the method comprising:

the mobile node sending the home packet data protocol address to an allocating node of the foreign network;

the allocating node allocating or participating in the allocation of an allocated packet data protocol address to the mobile node;

the allocating node receiving a received packet data protocol address of a receiving node; and based on the home packet data protocol address, the received packet data protocol address, and the allocated packet data protocol address, the allocating node sending or arranging for another network node to send a message to the receiving node, the message indicating a binding between the allocated packet data protocol address and the home packet data protocol address of the mobile node, wherein the mobile node is a Mobile Internet Protocol (MIP)-enabled mobile node, the binding procedure is a MIP binding procedure, and the allocated packet data protocol address is a MIP care of address (CoA) or co-located care of address (CoCoA).

2. A method according to claim 1, wherein the receiving node is a home agent of the mobile node in the home packet data network.

3. A method according to claim 2, wherein the mobile node sends the received packet data protocol address of the home agent to the allocating node.

4. A method according to claim 2, wherein the allocating node receives the received packet data protocol address of the home agent through home agent discovery messaging.

5. A method according to claim 1, wherein the receiving node is a correspondent node in communication with the mobile node.

6. A method according to claim 5, wherein the mobile node sends the received packet data protocol address of the correspondent node to the allocating node.

7. A method according to any one of claims 1-6, wherein the foreign network is a General Packet Radio Service (GPRS) network and the allocating node is a GPRS Support Node (GGSN) of the GPRS network.

8. A method according to claim 7, wherein the mobile node sends its home packet data protocol address to the GGSN within a packet data protocol (PDP) context activation procedure.

9. A method according to claim 7, wherein the mobile node sends its allocated packet data protocol address to the GGSN within a packet data protocol (PDP) context modification procedure.

10. A method according to claim 9, wherein the allocated packet data protocol address is sent in a packet data protocol (PDP) configuration options field in the packet data protocol (PDP) context modification procedure.

11. A method of performing a binding procedure for a mobile node in a foreign network, the mobile node having roamed from a home network and having a home packet data protocol address, the method comprising:

the mobile node sending the home packet data protocol address to an allocating node of the foreign network;

the allocating node allocating or participating in the allocation of an allocated packet data protocol address to the mobile node;

the allocating node receiving a received packet data protocol address of a receiving node; and based on the home packet data protocol address, the received packet data protocol address, and the allocated packet data protocol address, the allocating node sending or arranging for another network node to send a message to the receiving node, the message indicating a binding between the allocated packet data protocol address and the home packet data protocol address of the mobile node, wherein the receiving node is a home agent of the mobile node in the home packet data network and the mobile node sends the received packet data protocol address of the home agent to the allocating node.

12. A method according to claim 11, wherein the allocating node receives the received packet data protocol address of the home agent through home agent discovery messaging.

13. A method of performing a binding procedure for a mobile node in a foreign network, the mobile node having roamed from a home network and having a home packet data protocol address, the method comprising:

the mobile node sending the home packet data protocol address to an allocating node of the foreign network;

the allocating node allocating or participating in the allocation of an allocated packet data protocol address to the mobile node;

the allocating node receiving a received packet data protocol address of a receiving node; and based on the home packet data protocol address, the received packet data protocol address, and the allocated packet data protocol address, the allocating node sending or arranging for another network node to send a message to the receiving node, the message indicating a binding between the allocated packet data protocol address and the home packet data protocol address of the mobile node, wherein the receiving node is a correspondent node in communication with the mobile node, and the mobile node sends the received packet data protocol address of the correspondent node to the allocating node.

14. A method of performing a binding procedure for a mobile node in a foreign network, the mobile node having roamed from a home network and having a home packet data protocol address, the method comprising:

the mobile node sending the home packet data protocol address to an allocating node of the foreign network;

the allocating node allocating or participating in the allocation of an allocated packet data protocol address to the mobile node;

the allocating node receiving a received packet data protocol address of a receiving node; and based on the home packet data protocol address, the received packet data protocol address, and the allocated packet data protocol address, the allocating node sending or arranging for another network node to send a message to the receiving node, the message indicating a binding between the allocated packet data protocol address and the home packet data protocol address of the mobile node, wherein the foreign network is a General Packet Radio Service (GPRS) network and the allocating node is a GPRS Support Node (GGSN) of the GPRS network and the mobile node sends its allocated packet data protocol address to the GGSN within a packet data protocol (PDP) context modification procedure.

15. A method according to claim 14, wherein the mobile node sends its home packet data protocol address to the GGSN within a packet data protocol (PDP) context activation procedure.

16. A method according to claim 14, wherein the allocated packet data protocol address is sent in a packet data protocol (PDP) configuration options field in the packet data protocol (PDP) context modification procedure.

* * * * *

UNITED STATES PATENT AND TRADEMARK OFFICE
CERTIFICATE OF CORRECTION

PATENT NO. : 7,640,017 B2 Page 1 of 1
APPLICATION NO. : 10/548920
DATED : December 29, 2009
INVENTOR(S) : Xiaobao Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this

Twenty-first Day of December, 2010

David J. Kappos
*Director of the United States Patent and Trademark Office*